US010691181B2

(12) United States Patent
Su et al.

(10) Patent No.: US 10,691,181 B2
(45) Date of Patent: Jun. 23, 2020

(54) DEVICE ENCLOSURES WITH SEPARATOR CAMS

(71) Applicant: Hewlett-Packard Development Company, L.P., Houston, TX (US)

(72) Inventors: Victor Su, Taipei (TW); Chi-Hsuan Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 15/762,044

(22) PCT Filed: Nov. 13, 2015

(86) PCT No.: PCT/US2015/060716
§ 371 (c)(1),
(2) Date: Mar. 21, 2018

(87) PCT Pub. No.: WO2017/082935
PCT Pub. Date: May 18, 2017

(65) Prior Publication Data
US 2018/0260005 A1   Sep. 13, 2018

(51) Int. Cl.
*A47B 5/00* (2006.01)
*G06F 1/18* (2006.01)
*E05F 1/00* (2006.01)

(52) U.S. Cl.
CPC ............... *G06F 1/182* (2013.01); *E05F 1/00* (2013.01); *G06F 1/181* (2013.01)

(58) Field of Classification Search
CPC ......... G06F 1/181; G06F 1/182; G06F 1/1601
See application file for complete search history.

(56) References Cited

U.S. PATENT DOCUMENTS

| 5,375,922 | A | * | 12/1994 | Brustle | ................ | A47B 88/427 |
| | | | | | | 312/330.1 |
| 5,732,000 | A | * | 3/1998 | Chiesi | ..................... | G06F 1/181 |
| | | | | | | 361/679.57 |
| 6,389,233 | B2 | | 5/2002 | Kawando | | |
| 6,390,693 | B1 | | 5/2002 | Miyamoto et al. | | |
| 6,850,703 | B2 | | 2/2005 | Miyazaki et al. | | |

(Continued)

FOREIGN PATENT DOCUMENTS

| JP | 07015978 Y2 | 4/1995 |
| JP | 07040062 Y2 | 9/1995 |

OTHER PUBLICATIONS

Sommitz, David, "Zoom Lens Barrel Design," Apr. 30, 2013, pp. 1-32.

*Primary Examiner* — Matthew W Ing
(74) *Attorney, Agent, or Firm* — HP Inc. Patent Department

(57) ABSTRACT

In an example, an enclosure opener may comprise an external actuator disposed externally to a device enclosure and having a post that extends into the enclosure, and a first separator cam disposed within the enclosure. The first separator cam is be rotatably engaged with the post of the external actuator. Upon rotation of the post relative to the enclosure, the first separator cam is to rotate and engage with an internal surface of the enclosure such that the first separator cam exerts an opening force against the internal surface to cause the device enclosure to separate along a mating seam to open the enclosure.

17 Claims, 4 Drawing Sheets

(56) References Cited

U.S. PATENT DOCUMENTS

| | | | |
|---|---|---|---|
| 6,930,727 B2 | 8/2005 | Uwagawa et al. | |
| 7,226,139 B2 * | 6/2007 | Salice | A47B 88/427 312/330.1 |
| 7,758,133 B2 * | 7/2010 | Chen | G06F 1/181 312/223.2 |
| 2002/0129479 A1 | 9/2002 | Chen | |
| 2003/0006618 A1 | 1/2003 | Kalsi | |
| 2005/0231898 A1 * | 10/2005 | Sura | G06F 1/181 361/679.58 |
| 2009/0212679 A1 * | 8/2009 | Frousiakis | A47B 88/427 312/334.1 |
| 2014/0133095 A1 * | 5/2014 | Wu | G06F 1/1616 361/692 |

* cited by examiner

DEVICE ENCLOSURES WITH SEPARATOR CAMS

BACKGROUND

Electronic devices may have a device enclosure that covers or encloses some or all of the internal components of the computing device. The enclosure may have one or more portions, with the portions mated to each other along mating seams. Together, all of the mated portions of the enclosure may form the complete outer enclosure, shell, or housing of the electronic device. The separate portions of the enclosure may be fastened together using mechanical fasteners.

DETAILED DESCRIPTION

Figure 1A:
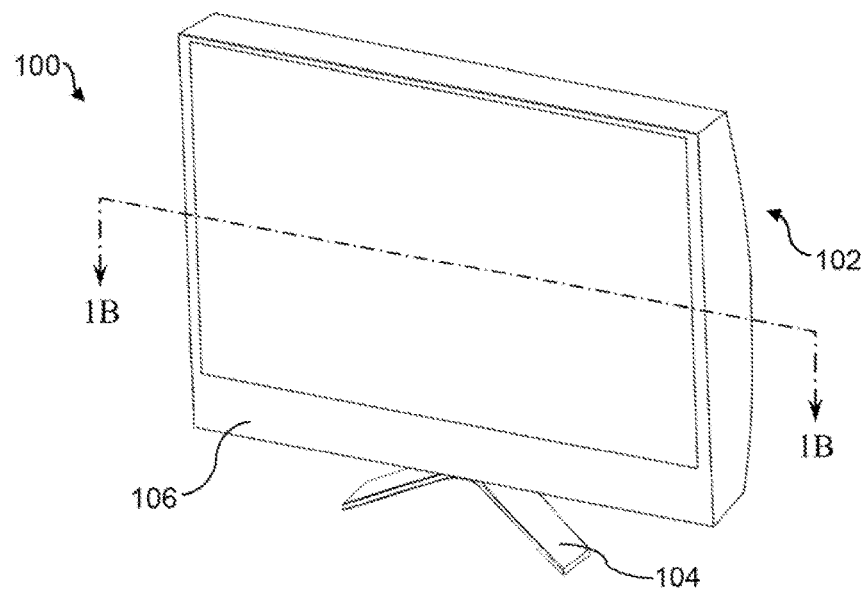
FIG. 1A is a perspective view of an electronic device having an example enclosure opener.

Electronic devices may have a device enclosure that encloses or covers some or all of the internal components of the electronic device. The enclosure may also be referred to as the housing cover, or outer shell of the electronic device. The electronic device may have electronic or computing components, connections, displays, or other parts disposed or mounted wholly or partially within the enclosure, and such internal components may need to be accessed, in some situations.

The enclosure may have one or more portions, with the portions mated to each other along mating seams. The enclosure may have a single mating seam where two halves or shells of the enclosure meet, or, further, the enclosure may have a plurality of mating seam, where more than two portions or shells come together and meet one another. Together, all of the mated portions of the enclosure may form the complete outer enclosure, shell, or housing of the electronic device. The mating seams may also include a sealing strip or material to help make the enclosure resistant to outside moisture, in some situations. The separate portions of the enclosure may be attached to one another, or an internal mounting structure or frame, through integrated mechanical features, such as snaps or clips. Further, the separate portions of the enclosure may be assembled together using separate, external mechanical components, such as screws or other mechanical fasteners. Enclosures may exclusively use integrated features for assembly in some situations, exclusively use external mechanical components in other situations, or use a combination of integrated features and external components for assembly. External fasteners may be engaged with the enclosure portions using exterior access or assembly holes. Further, such holes may allow a fastener driver, such as a screwdriver for example, to engage with each fastener to tighten or loosen it. Such exterior access holes can include a filler component, such as a rubber stopper or pug, which may be inserted into each hole after assembly to hide the hole and improve the aesthetic appearance of the electronic device.

In some situations, it may be desirable to disassemble the enclosure of the electronic device after it has been assembled. If mechanical fasteners such as screws are used to assemble the enclosure, subsequent disassembly may entail removing a stopper or plug from each screw hole in order to access the screw head, and then unscrewing each individual fastener from the respective hole. On certain electronic devices, this procedure could be complex and time consuming. A user may need to disassemble the device in a faster manner, in some situations.

In further situations, it may be desirable to avoid having exterior access holes for fasteners, plugged or not, on the exterior surfaces of the electronic device. Omitting such holes may improve the aesthetic appearance of the device, or give the enclosure a desired smoother exterior. Utilizing integrated snaps or clips on the enclosure portions to mate along the seams may eliminate the use of mechanical fasteners and exterior assembly and access holes. However, using such integrated features to assemble the device's enclosure may make further or subsequent disassembly of the device difficult or impractical. The use of such integrated assembly features may additionally cause the electronic device to be aesthetically or functionally damaged if a user were to attempt disassembly of the device. The use of such snaps or clips may be especially problematic when used on an electronic device that encourages disassembly and reassembly, such as on a device having internal components that can be upgraded or replaced, or a device that may need repairs during its life.

Implementations of the present disclosure provide an electronic device enclosure that includes an internal opener to assist in disassembling the device. The enclosure opener may avoid the use of external mechanical fasteners to assemble and hold together multiple portions of an electronic device enclosure. The absence of such fasteners may improve the aesthetics of the electronic device, as external access holes may also be avoided. Further, implementations of the present disclosure may provide an enclosure opener that allows a user to easily disassemble the enclosure without damaging the appearance or function of the electronic device or its enclosure.

Figure 1B:
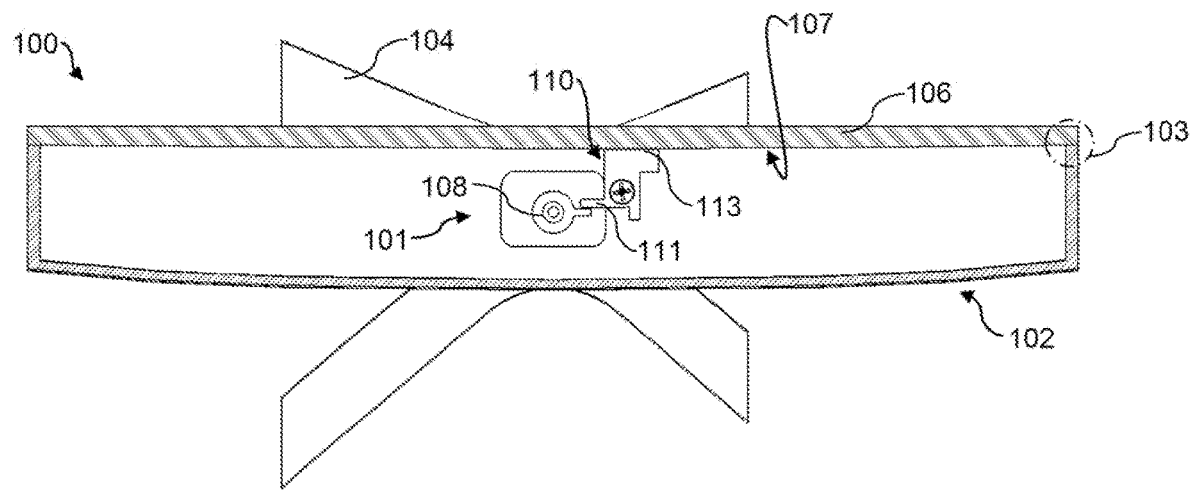
FIG. 1B is a cross-sectional view of an electronic device having an example enclosure opener.

Referring now to FIG. 1A, a perspective view of an electronic device 100 having a device enclosure 102 and comprising an example enclosure opener is illustrated. The electronic device 100, in some implementations, may be a computing device. The electronic device 100 may be an al-in-one computer in further implementations, or may be a part thereof. The electronic device 100 may be a display device, such as a computer monitor, television, or other display, in other implementations, or another type of electronic device having an outer case, housing, or enclosure. Referring additionally to FIG. 1B, a cross-sectional view of the example electronic device 100 comprising an example enclosure opener 101, taken along view line 1B-1B of FIG. 1A, is illustrated. An example enclosure opener 101 may comprise an external actuator 104 disposed externally to the device enclosure 102, and a separator cam 110 disposed within the enclosure 102. The external actuator 104 may have a post 108 that extends into the enclosure 102, and the first separator cam 110 may be rotatably engaged with the post 108.

The device enclosure 102 may be a rigid structure that may wholly or partially encompass or contain other components of the electronic device 100 within. The enclosure 102 may also be referred to as a housing, a case or casing, a cover, a shell, or another similar term. The enclosure may include multiple removable portions that, when assembled together, protect and cover components of the electronic device disposed within. The enclosure 102 may also include connection ports or bays, wherein internal components of the electronic device 100 may be connected to external cords, cables, or other components, through walls of the enclosure 102. The multiple portions of the enclosure 102 may be mated together along a single mating seam 103, for example, or along multiple mating seams 103, and may be mated together so that such seams may prevent or inhibit fluid from passing through, in some implementations. Further, the multiple portions of the device enclosure 102 may use integrated retaining structures or features to mate or attach along the mating seams, or to hold the multiple portions of the enclosure 102 to each other along the mating seams 103. Such integrated retaining features may be structured such that the enclosure 102 may be disassembled along the mating seams without damaging the retaining features, in some implementations. In further implementations, the enclosure 102 may at least comprise a front cover 106 mated to the rest of the enclosure 102 along mating seam 103. In yet further implementations, the front cover 106 may be referred to as a first enclosure shell, while the remainder of the enclosure 102 may be referred to as a second enclosure shell.

The external actuator 104 may be rotatably attached to the enclosure 102, such that the external actuator 104 is able to rotate relative to the enclosure 102. In some implementations, the external actuator 104 may be a separate portion of the enclosure 102 itself. In further implementations, the external actuator 104 may be a separate feature or part of the electronic device 100 from the enclosure 102, such as, for example, a handle or lever. In yet further implementations, the external actuator 104 may be a device stand or base, or a part thereof, upon which the enclosure 102 or the entire electronic device 100 may rest upon on a surface.

The external actuator 104 may have a post 108 that extends from the external actuator 104, through a wall or thickness of the enclosure 102, and into an interior space or cavity within the enclosure 102, within which the separator cam 110 may be wholly or partially disposed. In some implementations, the post 108 is to rotate relative to the enclosure 102, in accordance with, or correspondingly to, a rotation of the external actuator 104. In other words, upon the external actuator 104 being rotated relative to the enclosure 102, the post 108 may also rotate a corresponding amount and in a corresponding direction as the external actuator 104, relative to the enclosure 102. Thus, a user or other external force may be able to rotate the post 108 within the enclosure 102 by rotating the external actuator 104 in the desired fashion.

The separator cam 110 may be disposed within the enclosure 102, in some implementations. In other implementations, the separator cam 110 may be only partially disposed within the enclosure 102, and have a portion that is also disposed outside of the enclosure 102. The separator cam 110 may be rotatably engaged with the enclosure 102 such that the separator cam 110 can rotate relative to the enclosure 102. Additionally, the separator cam 110 may be rotatably engaged with the post 108 of the external actuator 104. The separator cam 110 may include an engagement tab 111 to engage with a complementary feature on the post 108. Further, the separator cam 110 may be disposed within the enclosure, such that an expansion portion 113 of the separator cam 110 is in close proximity to an internal surface 107 of the enclosure 102. The expansion portion 113 may be disposed in close proximity to the internal surface 107 such that, upon the separator cam 110 rotating the expansion portion 113 is able to engage with or come into contact with the internal surface 107. In some implementations, the separator cam 110 may be disposed partially outside of the enclosure and partially inside of the enclosure such that the cam 110 may be rotatably engaged with the post 108 outside of the enclosure and still have the expansion portion 113 be in close proximity to the internal surface 107 on the inside of the enclosure 102, for example.

Figure 1C:
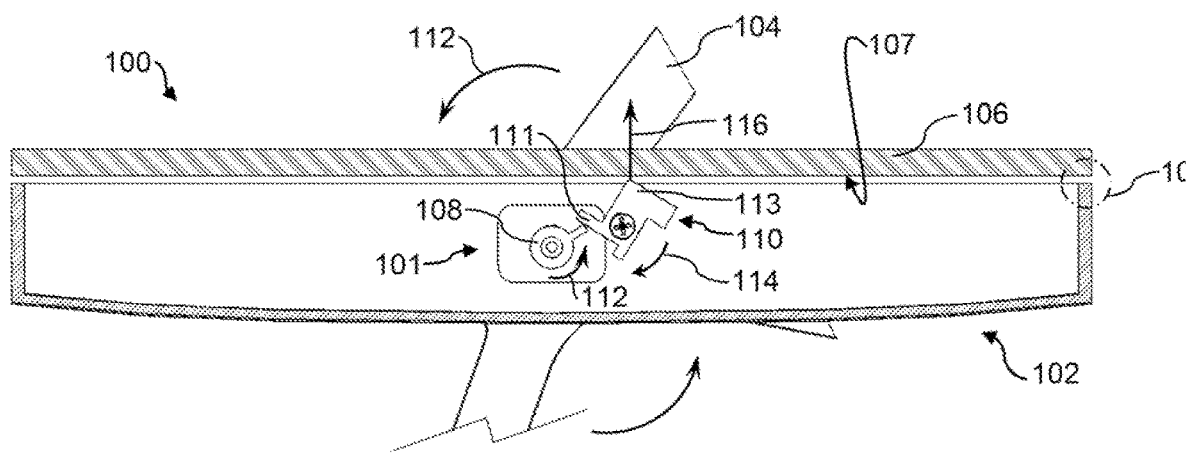
FIG. 1C is a cross-sectional view of an electronic device having an example enclosure opener.

Referring additionally to FIG. 1C, an example enclosure opener 101 is illustrated as it undergoes such a rotational action. The separator cam 110 may be inversely rotatably engaged with the post 108, such that, upon the external actuator 104, and this, the post 108 rotating in a first angular direction, or an opening direction 112, for example, the engagement of the separator cam 110 with the post may cause the cam 110 to rotate in an angular direction 114 that is opposite from the first angular direction 112. In other words, upon the post 108 rotating in the first angular direction 112, the complementary feature on the post 108 may exert a force on the engagement tab 111 of the separator cam 110, thereby causing the separator cam 110 to rotate in a direction 114 opposite that of the first angular direction 112. This rotation in an opposite angular direction 114 may cause the expansion portion 113 of the separator cam 110 to contact the internal surface 107 of the enclosure 102 and exert an outward, opening force 116 against such an internal surface 107. The outward, opening force 116 may cause the enclosure portion comprising the internal surface 107 to separate along the mating seam 103 from the remainder of the enclosure 102. In the example shown in FIG. 1C, the opening force 116 may cause the front cover 106 to separate along its respective mating seam 103 from the rest of the enclosure 102. Note, as mentioned above, the front cover 106, along with other portions of the enclosure 102, may be assembled along the mating seam 103 using integrated fastening features such as clips, tabs, or snaps. The opening force 116 from the separator cam 110 exerted on the internal surface 107 may be of sufficient magnitude to disengage any integrated fastening features along the mating seam 103 and to separate the enclosure 102 along such a seam to open the enclosure. Once the portion of the enclosure 102, or in the case of the illustrated example, the front cover 106, is separated or split along the respective mating seam 103, a user may grasp the separated enclosure 102 and further open it in order to access components of the electronic device that may be disposed within the enclosure 102. In further implementations, the separator cam 110 may be rotationally biased in a direction opposite that of direction 114. Thus, after the post 108 ceases to rotate along direction 112, and returns in a closing direction opposite to direction 112, a resilient bias member such as a spring may rotate the separator cam 110 opposite to direction 114 to return the cam 110 to its starting position as it is illustrated in FIG. 1B. Therefore, a user may reassemble the front cover 106 to the rest of the enclosure 102 without having to first manually rotate the separator cam 110 back to its starting position. It is important to note that the illustrated rotational directions are one example only. The enclosure opener 101 may be structured such that a rotation of the external actuator 104 in a direction other than is illustrated may also result in an opening force 116 being applied to an internal surface 107 of the enclosure 102 such that the enclosure 102 separates along a mating seam such as seam 103.

Figure 2A:
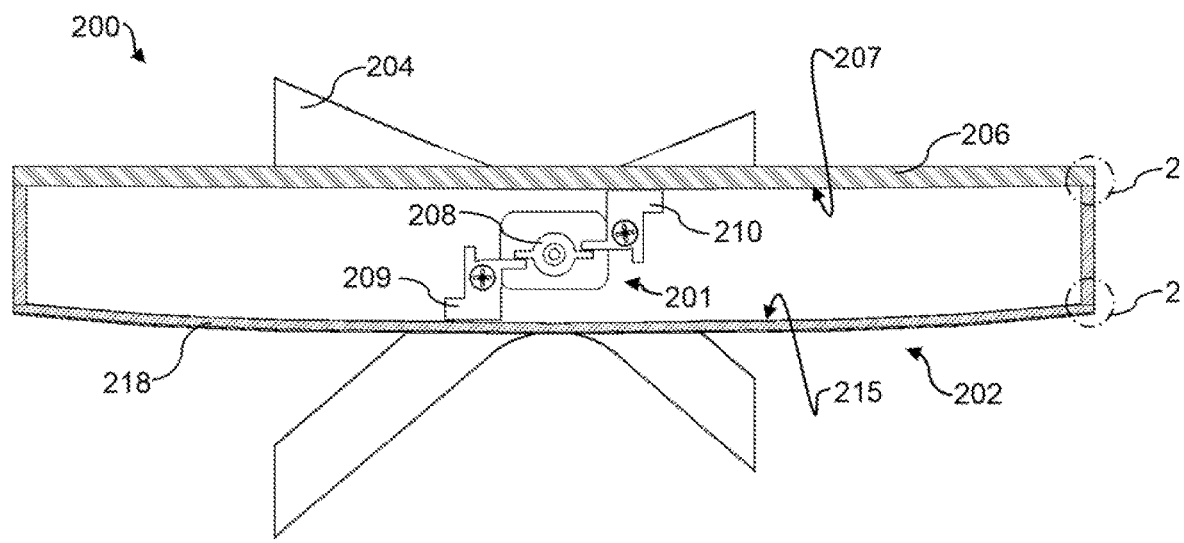
FIG. 2A is a cross-sectional view of an electronic device having an example enclosure opener.
Figure 2B:
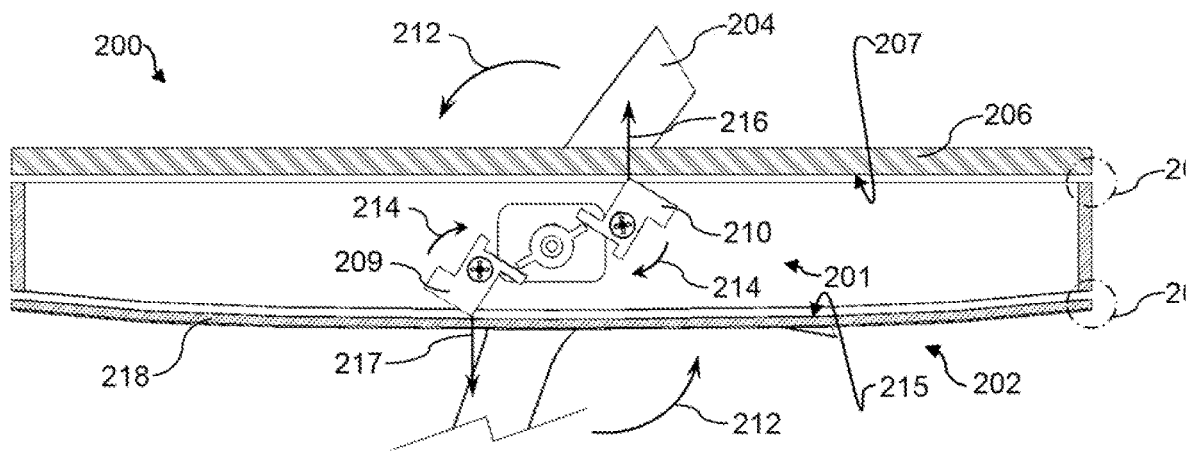
FIG. 2B is a cross-sectional view of an electronic device having an example enclosure opener.

Referring now to FIGS. 2A-2B, cross-sectional views of an example enclosure opener 201 of an electronic device 200 are illustrated. Example enclosure opener 201 may be similar to example enclosure opener 101. Further, the similarly named elements of example enclosure opener 201 may be similar in function and/or structure to the elements of example enclosure opener 101, as they are described above. The enclosure opener 201 may be disposed within an enclosure 202 of the electronic device 200. The enclosure 202 may comprise multiple removable portions, such as a front cover 206 and a back cover 218, for example. The front and back covers 206 and 218 may be assembled to the rest of the enclosure 202 along mating seams 203 and 205, respectively, in some implementations. In other implementations, the enclosure 202 many include additional removable portions, such as side covers, or top and bottom covers.

The example enclosure opener 201 may comprise a plurality of separator cams, such as a first separator cam 209, and a second separator cam 210. Each of the separator cams 209 and 210 many be rotatably engaged with the enclosure 202 and the post 208 of the external actuator 204, as described above. More specifically, each of the separator cams 209 and 210 may include an engagement tab to engage with a complementary feature on the post 108, such that, when the external actuator 204, and thus, the post 208 rotates in an opening direction or a first angular direction 212, for example, the post 208 exerts a force on each of the engagement tabs of the separator cams 209 and 210 to rotate each cam in a direction 214 opposite that of direction 212. Additionally, each of the separator cams 209 and 210 may further include an expansion portion to engage with a first internal surface 215 and a second internal surface 207, respectively, of the enclosure 202. Upon rotation of each of the separator cams 209 and 210, the expansion surface of each cam may come into contact with the respective internal surface and exert an outward, opening force 217 and 216, respectively, on the internal surface. In other words, the first separator cam 209 may apply or exert a first opening force against internal surface 215, while the second separator cam 210 may apply or exert a separate, second opening force 216 against internal surface 207. The opening forces 216 and 217 may each have a magnitude sufficient to overcome the fastening force of any fasteners holding the front and back covers 206 and 218 to the rest of the enclosure 202 along the mating seams 203 and 205. In other words, once exerted, the opening forces 216 and 217 may cause the front and back covers 206 and 218 to separate along the respective mating seam 203 and 205 from the remainder of the enclosure 202, as illustrated in FIG. 2B. In some implementations, the opening forces 216 and 217 may be exerted or applied by the respective separator cam in different directions from each other. In further implementations, the opening forces 216 and 217 may be applied in a substantially outward direction from the post 208.

In some implementations, the first and second separator cams 209 and 210 may be disposed in a fashion wherein the expansion portions of both of the cams may come into contact with, and apply separate opening forces to, the sane internal surface instead of different internal surfaces, as is illustrated in FIG. 2B. In further implementations, the enclosure opener 201 may include more than two separator cams, some or each of which may be disposed in a fashion such that it is able to apply a separate opening force to a different internal surface than the other cams.

In yet further implementations, each of the plurality of separator cams may be rotatably biased such that each cam returns to a starting position upon the post 208 rotating in a closing direction. The closing direction, in some implementations, may be opposite in direction to the first angular direction 212 Thus, a user may reassemble the front and back covers 206 and 218 on to the enclosure 202 without having to first manually rotate the separator cams back to their respective starting positions.

Figure 3A:
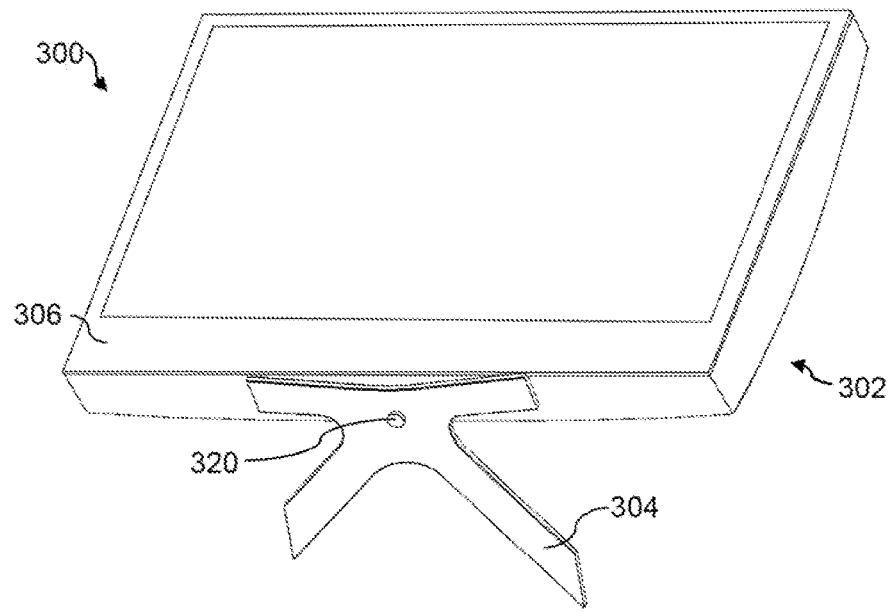
FIG. 3A is a bottom perspective view of an electronic device having an example enclosure opener.
Figure 3B:
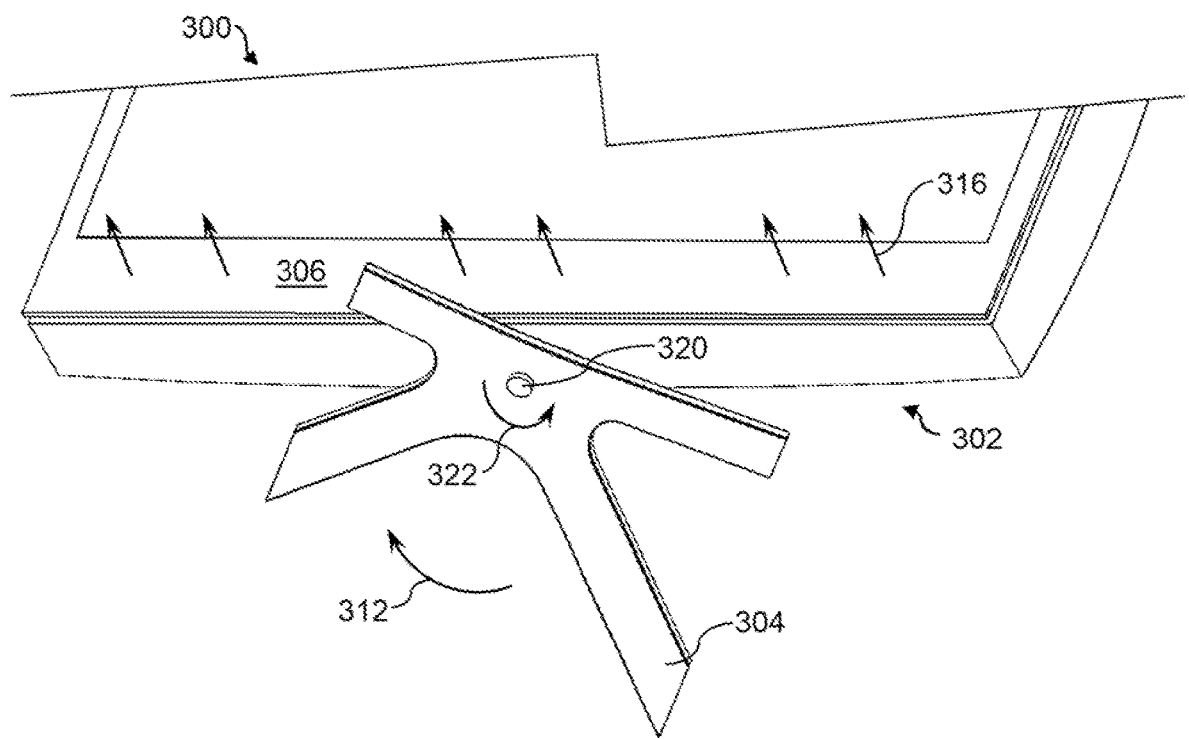
FIG. 3B is a detail perspective view of an electronic device having an example enclosure opener.

Referring now to FIG. 3A, a bottom perspective view of an electronic device 300 containing an example enclosure opener (not pictured) is illustrated. Referring additionally to FIG. 3B, a detail bottom perspective view of an electronic device having an example enclosure opener is illustrated. The example enclosure opener within electronic device 300 may be similar to example enclosure opener 101 and 201. Further, the similarly named elements of the example enclosure opener within electronic device 300 may be similar in function and/or structure to the elements of example enclosure opener 101 and 201, as they are described above. The electronic device 300 may include an enclosure 302 having a front cover 306. Further, the enclosure opener within the electronic device 300 may include an external actuator 304. The external actuator 304 may be rotatably engaged with the enclosure 302 such that the external actuator 304 may be rotated relative to the enclosure 302. When rotated relative to the enclosure 302, the external actuator 304 may cause the enclosure opener within the enclosure 302 to split or separate the front cover 306 from the remainder of the enclosure 302, as is described above. Further, the external actuator 304 may include a securing feature 320. The securing feature 320 may be a component that can removably tighten the external actuator 304 to the enclosure 302 of the electronic device 300. Once tightened to the enclosure 302, the external actuator 304 may no longer be able to rotate relative to the enclosure 302. Therefore, the securing feature 320, when tightened to the external actuator 304, may prevent the enclosure opener from separating the enclosure 302. In some implementations, the securing feature may be a thumb screw, or other rotatable knob or component.

Referring to FIG. 3B, the securing feature 320 may, in some implementations, be unlocked or loosened by rotating for example, in a direction 322. Once the securing feature is loosened, the external actuator 304 may once again be able to rotate relative to the enclosure 302, for example, in a direction 312 in order to cause the enclosure opener to separate the front cover 306 away from the remainder of the enclosure 302 in a direction 316.

What is claimed is:
1. An enclosure opener, comprising:
   an external actuator disposed externally to a device enclosure and having a post that extends into the device enclosure; and
   a first separator cam and a second separator cam disposed within the device enclosure and rotatably engaged with the post of the external actuator,
   wherein, upon rotation of the post relative to the device enclosure, the first separator cam is to rotate and contact a first internal surface of the device enclosure, and the second separator cam is to rotate and contact a second internal surface of the device enclosure, such that the first separator cam exerts an opening force in a first direction against the first internal surface, and the second separator cam exerts a separate opening force in a different second direction against the second internal surface that is separate from the first internal surface, to cause the device enclosure to separate along a mating seam of the device enclosure to open the device enclosure.

2. The enclosure opener of claim 1, wherein the post is to rotate correspondingly to a rotation of the external actuator.

3. The enclosure opener of claim 2, wherein upon the rotation of the post relative to the device enclosure, the first separator cam is to rotate in a direction opposite that of the rotation of the post.

4. The enclosure opener of claim 1, wherein the opening force of the first separator cam and the separate opening force of the second separator cam are to cause the device enclosure to separate along a plurality of mating seams of the device enclosure to open the device enclosure.

5. The enclosure opener of claim 1, wherein the first direction is opposite the second direction.

6. The enclosure opener of claim 1, wherein the post has a first side member that is engaged to the first separator cam, and the post has a second side member that is engaged to the second separator cam.

7. The enclosure opener of claim 6, wherein the rotation of the post causes the first side member and the second side member to move in different directions.

8. An enclosure opener, comprising:
   an external actuator disposed externally to a device enclosure and having a post that extends into the device enclosure; and
   a first separator cam and a second separator cam disposed within the device enclosure and rotatably engaged with the post of the external actuator,
   wherein, upon rotation of the post relative to the device enclosure, the first and second separator cams are to rotate and contact a first internal surface and a second internal surface, respectively, of the device enclosure such that the first separator cam exerts an opening force in a first direction against the first internal surface, and the second separator cam exerts an opening force in a different second direction against the second internal surface, to cause the device enclosure to separate along a mating seam of the device enclosure to open the device enclosure.

9. The enclosure opener of claim 8, wherein upon the rotation of the post relative to the device enclosure, each of the first and second separator cams rotates in a direction opposite that of the rotation of the post.

10. The enclosure opener of claim 9, wherein the opening forces of the first and second separator cams are exerted in outward directions from the post.

11. The enclosure opener of claim 10, wherein each of the first and second separator cams is rotatably biased such that each of the first and second separator cams returns to a starting position upon the post rotating in a closing direction.

12. The enclosure opener of claim 8, wherein the first direction is opposite the second direction.

13. The enclosure opener of claim 8, wherein the post has a first side member that is engaged to the first separator cam, and the post has a second side member that is engaged to the second separator cam.

14. The enclosure opener of claim 13, wherein the rotation of the post causes the first side member and the second side member to move in different directions.

15. A device, comprising:
   a device enclosure comprising a first enclosure shell and a second enclosure shell mated to the first enclosure shell along a mating seam; and
   an enclosure opener comprising:
      an external actuator disposed externally to the device enclosure and having a post that extends into the device enclosure; and
      a first separator cam and a second separator cam disposed within the device enclosure and rotatably engaged with the post of the external actuator,
      wherein the first separator cam is to rotate and contact a first internal surface of the first enclosure shell such that the first separator cam exerts a first opening force in a first direction against the first internal surface upon rotation of the post relative to the device enclosure,
      wherein the second separator cam is to rotate and contact a second internal surface of the second enclosure shell such that the second separator cam exerts a second opening force in a second direction against the second internal surface upon the rotation of the post relative to the device enclosure, wherein the second direction is different from the first direction, and
      wherein the first and second opening forces against the first and second internal surfaces are to cause the first enclosure shell to separate along the mating seam from the second enclosure shell to open the device enclosure.

16. The device of claim 15, wherein the first separator cam is rotatably engaged with the post of the external actuator, such that the first separator cam is to rotate in a direction opposite that of the rotation of the post relative to the device enclosure.

17. The device of claim 16, wherein the external actuator is a device stand, upon which the device enclosure is to rest upon a surface.

* * * * *